United States Patent
Aoyagi

(10) Patent No.: US 11,079,019 B2
(45) Date of Patent: Aug. 3, 2021

(54) MATERIAL FOR GASKET

(71) Applicant: NICHIAS CORPORATION, Tokyo (JP)

(72) Inventor: Hideharu Aoyagi, Tokyo (JP)

(73) Assignee: NICHIAS CORPORATION, Tokyo (JP)

( * ) Notice: Subject to any disclaimer, the term of this patent is extended or adjusted under 35 U.S.C. 154(b) by 59 days.

(21) Appl. No.: 15/532,196

(22) PCT Filed: Dec. 1, 2015

(86) PCT No.: PCT/JP2015/005969
§ 371 (c)(1),
(2) Date: Jun. 1, 2017

(87) PCT Pub. No.: WO2016/088363
PCT Pub. Date: Jun. 9, 2016

(65) Prior Publication Data
US 2017/0335967 A1 Nov. 23, 2017

(30) Foreign Application Priority Data
Dec. 1, 2014 (JP) .............................. JP2014-243460

(51) Int. Cl.
*F16J 15/08* (2006.01)
*C09K 3/10* (2006.01)
*F02F 11/00* (2006.01)

(52) U.S. Cl.
CPC .............. *F16J 15/0818* (2013.01); *C09K 3/10* (2013.01); *C09K 3/1009* (2013.01); *F02F 11/00* (2013.01); *F16J 15/08* (2013.01); *F16J 15/0806* (2013.01); *F16J 2015/0856* (2013.01)

(58) Field of Classification Search
CPC .......... F16J 15/0818; C09K 3/10; F02F 11/00
See application file for complete search history.

(56) References Cited

U.S. PATENT DOCUMENTS

| | | | |
|---|---|---|---|
| 7,354,047 B2 | 4/2008 | Saito et al. | |
| 2002/0179190 A1* | 12/2002 | Brown | C23C 22/73 148/262 |
| 2003/0022005 A1* | 1/2003 | Miyashita | B32B 15/06 428/465 |
| 2004/0195781 A1 | 10/2004 | Saito et al. | |
| 2006/0228568 A1 | 10/2006 | Saito et al. | |
| 2008/0124561 A1 | 5/2008 | Saito et al. | |
| 2011/0012315 A1* | 1/2011 | Kitajima | F16J 15/12 277/592 |
| 2016/0369742 A1 | 12/2016 | Tanaka et al. | |

FOREIGN PATENT DOCUMENTS

| | | | | |
|---|---|---|---|---|
| CN | 1500627 | A | 6/2004 | |
| CN | 1840735 | A | 10/2006 | |
| JP | H01-116382 | A | 5/1989 | |
| JP | H03-227622 | A | 10/1991 | |
| JP | H09170084 | * | 6/1997 | .............. C23C 2/06 |
| JP | 2002-264253 | A | 9/2002 | |
| JP | 2008-088850 | A | 4/2008 | |
| JP | 2008088850 | * | 4/2008 | .............. B05D 7/00 |
| JP | 4816793 | B2 | 11/2011 | |
| JP | 5545396 | B1 * | 7/2014 | .............. B32B 15/06 |

OTHER PUBLICATIONS

Saito—JP 2008-088850 A—MT—Gasket material—2008 (Year: 2008).*
Tanaka—JP 5545396 B1—MT—rubber-metal laminated gasket—2014 (Year: 2014).*
Takahashi—JP H09-170084 A—MT—phosphoric acid+zinc+alumina sol—1997 (Year: 1997).*
Feb. 16, 2016 International Search Report issued in International Patent Application No. PCT/JP2015/005969.
Feb. 16, 2016 Written Opinion of the International Searching Authority issued in International Patent Application No. PCT/JP2015/005969.
Apr. 3, 2018 Office Action issued in Chinese Patent Application No. 201580065428.7.

\* cited by examiner

*Primary Examiner* — Callie E Shosho
*Assistant Examiner* — John Vincent Lawler
(74) *Attorney, Agent, or Firm* — Oliff PLC

(57) ABSTRACT

A gasket material to be mounted in a vehicle engine, wherein, on one or both sides of a steel plate, a rubber layer is formed via a coating film including a reaction product of an acid component and a metal or a reaction product of an acid component and a metal compound, and at least one selected from zirconia, alumina and titania.

7 Claims, No Drawings

MATERIAL FOR GASKET

TECHNICAL FIELD

The invention relates to a material for a gasket (gasket material) to be mounted in a vehicle engine.

BACKGROUND ART

As a gasket to be mounted in a vehicle engine, in particular as a head gasket, rubber-coated stainless steel plates in which a rubber layer is laminated on a stainless steel plate are generally used. Further, in order to hold the rubber layer more firmly, a gasket material obtained by forming a chromate coating film of a chromium compound, phosphoric acid and silica on one or both sides of a stainless steel plate and laminating a rubber layer on the chromate film is also widely used (see Patent Document 1, for example).

However, a gasket material that is subjected to a chromate treatment involves a significantly serious problem in respect of environment since hexavalent chromium is contained in a chromate treatment liquid, etc. Therefore, there is a demand for a gasket material that has thermal resistance or adhesiveness equivalent to that of a chromate-treated gasket material, in particular, has sticking durability to an anti-freezing liquid and poses no problems on the environment. For example, a gasket material with a non-chromate film such as an organic-inorganic composite coating film containing a titanium compound and a fluoride instead of the chromate coating has been spreading (see Patent Document 2, for example).

RELATED ART DOCUMENTS

Patent Documents

Patent Document 1: JP-A-H03-227622
Patent Document 2: JP-A-2002-264253

SUMMARY OF THE INVENTION

An object of the invention is to provide a gasket material having resistance to a high-temperature anti-freezing liquid and posing no problems in respect of environment.

According to the invention, the following gasket material is provided.
1. A gasket material to be mounted in a vehicle engine, comprising a steel plate and, on one or both sides of the steel plate, a rubber layer via a coating film comprising a reaction product of an acid component and a metal or a reaction product of an acid component and a metal compound, and at least one selected from zirconia, alumina and titania.
2. The gasket material according to 1, wherein the acid component is at least one selected from phosphoric acid, orthophosphoric acid, fused phosphoric acid, phosphoric anhydride, acetic acid, formic acid, sulfuric acid, nitric acid, hydrofluoric acid, a fluoro complex and an organic acid.
3. The gasket material according to 1, wherein the acid component is a mixture obtained by combining two or more different kinds selected from phosphoric acid, orthophosphoric acid, fused phosphoric acid, phosphoric anhydride, acetic acid, formic acid, sulfuric acid, nitric acid, hydrofluoric acid, a fluoro complex and an organic acid.
4. The gasket material according to any one of 1 to 3, wherein the metal or a metal in the metal compound is at least one selected from Fe (iron), Zn (zinc), Ni (nickel), Al (aluminum), Ti (titanium), Zr (zirconium), Mg (magnesium), Mn (manganese), Ca (calcium), W (tungsten), Ce (cerium), V (vanadium), Mo (molybdenum), Li (lithium) and Co (cobalt).

According to the invention, it is possible to obtain a gasket material that has resistance to a high-temperature anti-freezing liquid and hence poses no problem in respect of environment. Since no chromate treatment that is harmful to a human body is conducted, this gasket material is effective as a countermeasure for social problems such as environmental protection, recyclability, etc.

MODE FOR CARRYING OUT THE INVENTION

Hereinbelow, an explanation will be made on the invention. In the invention, between a steel plate and a rubber layer, a coating film that is obtained from an acid component, a metal or a metal compound, and one or more inorganic oxides selected from zirconia, alumina and titanium is disposed. Specifically, a film made from a reaction product of an acid component and a metal or a reaction product of an acid component and a metal compound, and one or more selected from zirconia, alumina and titania is disposed.

The coating film is obtained by applying a treatment liquid for forming a coating film, followed by drying. The treatment liquid for forming a coating film may contain an acid component, a metal or a metal compound, and an inorganic oxide, or may contain a reaction product of an acid component and a metal or a metal compound, and an inorganic oxide.

As the acid component used in the invention, phosphoric acid, orthophosphoric acid, fused phosphoric acid, phosphoric anhydride, acetic acid, formic acid, sulfuric acid, nitric acid, hydrofluoric acid, an acid containing a fluoro complex, an organic acid, etc. can be given. It is preferred that these acid components be blended in a blending ratio of 5 to 70 wt % in solid matters in the treatment liquid for forming a coating liquid. The blending ratio is further preferably 10 to 40 wt %.

Basically, these acid components may be used singly. However, it is also possible to use different components in a mixture of two or more. The reason therefor is that, by using them in a mixture, reaction efficiency of an acid component and a metal component is increased, whereby a reaction product of an acid component and a metal or an acid component and a metal compound are formed quickly.

In particular, a fluoro complex is suitable for stably increasing the reaction efficiency. Examples of a fluoro complex include fluorotitanic acid, fluorozirconic acid, fluorosiliconic acid, fluoroaluniinic acid, fluorophosphoric acid, fluorocobaltic acid, fluorosulfuric acid, fluoroboric acid, etc. When a fluoro complex is selected as a second acid component, fluorotitanic acid or fluorozirconic acid may preferably be added. By adding these acids, a reaction product of an acid component and a metal or a reaction product of an acid component and a metal compound is formed more quickly.

An inorganic oxide is a component that imparts thermal resistance or resistance to high temperature anti-freezing liquid (hereinafter often referred to as "high-temperature anti-freezing liquid resistance"). Therefore, it is preferred that an inorganic oxide be uniformly dispersed in the resulting coating film. An inorganic oxide having excellent dispersibility in a treatment liquid is preferable. An inorganic oxide being excellent in adhesiveness with a primer layer is also preferable. As an inorganic oxide, zirconia, alumina and titania can be used, and they can be used singly or in combination of two or more. Preferable is alumina and/or zirconia. An inorganic oxide may be in a liquid phase or in a gaseous phase.

As the metal used in the present invention, Fe (iron), Zn (zinc), Ni (nickel), Al (aluminum), Ti (titanium), Zr (zirconium), Mg (magnesium), Mn (manganese) Ca (calcium), W (tungsten), Ce (cerium), V (vanadium), Mo (molybdenum), Li (lithium), Co (cobalt), etc. can be given. As the metal compound, oxides, hydroxides or fluorides of these metals can be given. In particular, Fe, Zn, Al, Ti, Zr, oxides of these metals, hydroxides of these metals, and fluorides of these metals are preferable since they are highly reactive with the acid component, thereby accelerating formation of a reaction product. These metals or metal compounds may be used singly or as a mixture of a plurality thereof, and the blending amount thereof is preferably 1 to 95 wt % in solid matters in the treatment liquid for forming a coating film. The blending amount is more preferably 30 to 90 wt %. In the case of a metal compound, the amount thereof is a value obtained by converting to an amount of the metal element.

As for the ratio of the two components in the treatment liquid, i.e. the inorganic oxide and the reaction product of an acid component and a metal or a metal compound, when the amount of the two components is taken as 100 mass %, the amount of reaction product of an acid component and a metal or metal compound is preferably 90 to 15 mass %, more preferably 75 to 35 mass %. By causing the blending ratio to be such a ratio, the reaction efficiency can be increased, and the resulting coating film can have excellent thermal resistance, high-temperature anti-freezing liquid resistance and adhesiveness with a primer layer.

As for the volume ratio of the two components in the treatment liquid, i.e. the inorganic oxide and the reaction product of an acid component and a metal or a metal compound, when the amount of the two components is taken as 100 vol %, the ratio of reaction product of an acid component and a metal or a metal compound is 90 to 25 vol %, preferably 80 to 50 vol %. By causing the blending ratio to be such a ratio, the resulting coating film can have excellent high-temperature anti-freezing liquid resistance.

The treatment liquid is obtained by dispersing or dissolving components such as the inorganic oxide in an appropriate solvent. As the solvent, water is preferred because of its low cost and excellent handling property. No specific restrictions are imposed on the total content of components such as the inorganic oxide, etc. and the total content is adjusted to attain a concentration suitable for coating. When the amount of a solvent is too large, a long period of time is taken for drying by heating. On the other hand, when the amount of the solvent is too small, coating properties becomes poor. Accordingly, for example, when water is used as the solvent, the amount of water is suitably adjusted to be 10 to 98 mass % of the total amount of the treatment liquid.

No specific restrictions are imposed on the method for applying the treatment liquid, and a known application means such as a roll coater can be used.

Drying of the treatment liquid applied is conducted at a temperature of 150 to 250° C. During this drying by heating, a coating film composed of a composite material of a reaction product of an acid component and a metal or a metal compound and an inorganic oxide is formed. The amount of the coating film is not particularly restricted, but about 50 to 1,000 mg/m$^2$ is appropriate from a practical viewpoint.

The coating film may essentially consist of the above-mentioned reaction product and the above-mentioned inorganic oxide. For example, 95 wt % or more, 98 wt % or more or 99 wt % or more of the coating film may be the above-mentioned reaction product and the above-mentioned inorganic oxide. Further, the composition of the invention may consist of the above-mentioned inorganic oxide. In this case, the composition may contain inevitable impurities.

In the invention, no particular restrictions are imposed on the kind of a steel plate, and a stainless steel plate (ferrite-based/martensite-based/austenite-based stainless steel plate), an iron steel plate, an aluminum steel plate, etc. can be used.

Subsequently, on the coating film, a primer layer can be formed. The primer layer is obtained, for example, by applying a primer solution that is formed by dissolving polybutadiene and a phenol resin in a solvent to the surface of the coating film, followed by drying.

As the polybutadiene, polybutadiene, hydrogenated polybutadiene, modified polybutadiene, etc. can be given. However, modified polybutadiene is preferable since it has high adhesiveness to the coating film, and as specific examples thereof, maleic-modified polybutadiene, epoxy-modified polybutadiene, urethane-modified polybutadiene and acrylic-modified polybutadiene can be preferably used. Further, as the phenol resin, either a novolak phenol resin or a resol phenol resin can be used. The polybutadiene and the phenol resin may respectively be used singly or in appropriate combination. In particular, when adhesiveness to a rubber layer is considered as important, a novolak phenol resin is used.

Further, a coupling agent may be incorporated into the primer solution, and the amount thereof is preferably from 0.5 to 20 mass % relative to the total amount (solid matters) of the polybutadiene and the phenol resin.

No specific restrictions are imposed on the method for applying a primer solution, and a known application means such as a roll coater can be used.

The primer solution applied is dried usually at a temperature of 150 to 250° C. During this drying, the formed primer layer is firmly adhered to the above-mentioned coating film. No restrictions are imposed on the film thickness of the primer layer, but it is preferably from 1 to 10 μm from a practical viewpoint.

Subsequently, a rubber layer is formed on the primer layer to complete the gasket material of the invention. Rubber for forming the rubber layer may be known rubber, but is preferably NBR, fluororubber, silicone rubber, acrylobutadiene rubber, HNBR, EPDM, etc. which are excellent in thermal resistance or chemical resistance. Furthermore, for forming the rubber layer, a rubber solution or a latex obtained by dissolving a rubber material in an appropriate solvent may be applied in a thickness of 20 to 130 μm by means of a skim coater, a roll coater, etc., followed by vulcanization adhesion at a temperature of 150 to 250° C.

EXAMPLES

The invention will be explained in more detail with reference to the Examples and the Comparative Examples, which should not be construed as limiting the scope of the invention.

Examples 1-1 to 1-8 and Comparative Example 1

On the both surfaces of a stainless steel plate, a treatment liquid for forming a coating film obtained by mixing components in blending ratios (wt %) shown in Table 1 was applied by means of a roll coater such that the amount of the coating film shown in Table 1 was attained, and then, was dried at 180° C. to form a coating film. Subsequently, on the coating film, a primer layer was formed using a novolak (phenol resin). Then, on the primer layer, a rubber layer was formed using a binary fluororubber, thereby to prepare a sample. The alumina used was amorphous, and had an average primary particle diameter of 13 nm. The average primary particle diameter was measured by means of an electron microscope.

For the resulting sample, resistance to an anti-freezing liquid was evaluated by the following method.

The sample prepared above was immersed in a car radiator coolant (Toyota Genuine Long Life Coolant) (50% LLC) to a position half of the sample (half-immersed) such that it became perpendicular to a liquid level thereof, and allowed to stand at a liquid temperature of 170° C. for 48 hours to 500 hours. Then, the sample was taken out of the coolant, and subjected to a drawing test for an un-immersed part, a boundary between an un-immersed part and an immersed part, and the immersed part.

A spiral with a radius of 4.5 mm was drawn 25 times on one surface of the sample by using a drawing tester specified in JIS-K6894, and the sample was evaluated by the following criteria. The results obtained are shown in Table 1.

5: The rubber layer was completely remained
4: The rubber layer partially fell off
3: About a half of the rubber layer fell off
2: The rubber layer was slightly remained
1: The rubber layer completely fell off

TABLE 1

| | | | Ex. 1-1 | Ex. 1-2 | Ex. 1-3 | Ex. 1-4 | Ex. 1-5 | Ex. 1-6 | Ex. 1-7 | Ex. 1-8 | Comp. Ex. 1 |
|---|---|---|---|---|---|---|---|---|---|---|---|
| Metal treatment layer | Blended amount [wt %] | Aluminum phosphate | 3.4 | 3.4 | 3.4 | 3.4 | 3.4 | 3.4 | 3.4 | 3.4 | 2.4 |
| | | Silica | | | | | | | | | 1.6 |
| | | Alumina | 5.5 | 5.5 | 5.5 | 5.5 | 5.5 | 5.5 | 5.5 | 5.5 | |
| | | Water | 91.1 | 91.1 | 91.1 | 91.1 | 91.1 | 91.1 | 91.1 | 91.1 | 96.0 |
| | | Total | 100.0 | 100.0 | 100.0 | 100.0 | 100.0 | 100.0 | 100.0 | 100.0 | 100.0 |
| | Amount of coating film [mg/m$^2$] | | 100 | 200 | 300 | 400 | 500 | 600 | 700 | 800 | 450 |
| Half-immersion 170° C. | Un-immersed part: Point in drawing test | 48 hrs | 4.5 | 5 | 5 | 5 | 5 | 5 | 5 | 5 | 5 |
| | | 72 hrs | 4 | 4 | 4 | 5 | 5 | 5 | 5 | 5 | 4 |
| | | 95 hrs | 4 | 4 | 4 | 4 | 4 | 4 | 4 | 4 | 4 |
| | | 168 hrs | 5 | 5 | 5 | 5 | 5 | 5 | 5 | 5 | 3.8 |
| | | 336 hrs | 3 | 4 | 4 | 4 | 4 | 4 | 4 | 4 | 2.3 |
| | | 500 hrs | 4 | 2 | 2 | 2.5 | 2.5 | 4 | 3 | 4 | 2.5 |
| | Boundary | 48 hrs | 1 | 2 | 2 | 3 | 2 | 2 | 2 | 2 | 1.8 |
| | | 72 hrs | 1 | 1.5 | 2.5 | 2 | 2.5 | 2 | 2 | 2 | 1.3 |
| | | 96 hrs | 1.5 | 2 | 2 | 2 | 2 | 2 | 2 | 1 | 1 |
| | | 168 hrs | 2 | 2 | 2 | 2 | 2.5 | 2 | 2 | 2 | 1.3 |
| | | 336 hrs | 1 | 1 | 1 | 1 | 1 | 1 | 1 | 1 | 1 |
| | | 500 hrs | 1 | 2 | 2 | 1 | 1 | 1 | 1 | 1 | 1 |
| | Immersed part: Point in drawing test | 48 hrs | 4.5 | 5 | 5 | 5 | 5 | 5 | 5 | 5 | 4 |
| | | 72 hrs | 4.5 | 4 | 4 | 4 | 4 | 4 | 4 | 4 | 1.5 |
| | | 96 hrs | 4 | 4 | 4 | 4 | 4 | 4 | 4 | 3.5 | 1.5 |
| | | 168 hrs | 4 | 4 | 4 | 4 | 4 | 4 | 4 | 3.5 | 1.8 |
| | | 336 hrs | 3.5 | 4 | 4 | 4 | 4 | 3 | 3 | 3 | 2 |
| | | 500 hrs | 2.5 | 4 | 3.5 | 3 | 3 | 3 | 3 | 2.5 | 2 |

Examples 2-1 to 2-5 and Comparative Examples 2 and 3

Samples were prepared in the same manner as in Example 1-1, except that nitrile rubber (NBR) was used instead of the fluororubber in the rubber layer, and the volume ratios of phosphoric aluminum and alumina in the coating film after drying were changed to those shown in Table 2. The volume ratio was obtained by calculating at the time of blending.

For the resulting sample, resistance to an anti-freezing liquid was evaluated by the following method.

The sample prepared above was fully immersed in a car radiator coolant (Toyota Genuine Long Life Coolant) (all-immersed) such that it became perpendicular to a liquid level thereof, and allowed to stand at a liquid temperature of 180° C. for 240 hours. Then, the sample was taken out of the coolant, and the shear strength thereof was measured by means of a universal tester. The results obtained are shown in Table 2.

TABLE 2

|  |  | Ex. 2-1 | Ex. 2-2 | Ex. 2-3 | Ex. 2-4 | Ex. 2-5 | Comp. Ex. 2 | Comp. Ex. 3 |
|---|---|---|---|---|---|---|---|---|
| Metal treatment layer | Aluminum phosphate/Alumina (Volume ratio) | 90/10 | 80/20 | 75/25 | 50/50 | 25/75 |  | 100/0 |
|  | Aluminum phosphate/Silica (Volume ratio) |  |  |  |  |  | 50/50 |  |
| Full immersion 180° C. × 240 hrs | Shear strength [MPa] | 5 | 22 | 21 | 21 | 5 | 3 | 2 |

Examples 3-1 to 3-3

On the both surfaces of a stainless steel plate, a treatment liquid for forming a coating film obtained by mixing components in a blending ratio (wt %) shown in Table 3 was applied by means of a roll water and dried at 180° C. to form a coating film (amount of coating film: 450 mg/m$^2$). Subsequently, in the same manner as in Example 1-1, a primer layer and a rubber layer were formed on the coating film, thereby to obtain samples. The alumina used was amorphous.

For the resulting samples and the sample in Comparative Example 1, resistance to an antifreezing liquid was evaluated by the following method.

The samples prepared above were immersed in a car radiator coolant (Toyota Genuine Long Life Coolant) to a position half of the sample (half-immersed) such that they became perpendicular to a liquid level thereof, and allowed to stand at a liquid temperature of 170° C. for 72 hours and 168 hours. Then, the sample was taken out of the coolant, and subjected to a drawing test for an un-immersed part and an immersed part.

A spiral with a radius of 4.5 mm was drawn 25 times on the surface of the sample by using a drawing tester specified in JIS-K6894, and the sample was evaluated by the same criteria as Example 1-1. The results are shown in Table 3.

TABLE 3

|  |  |  | Ex. 3-1 | Ex. 3-2 | Ex. 3-3 | Comp. Ex. 1 |
|---|---|---|---|---|---|---|
| Metal treatment layer | Blended amount [wt %] | Aluminum phosphate | 3.5 | 3.5 | 3.5 | 2.4 |
|  |  | Silica |  |  |  | 1.6 |
|  |  | Zirconia | 1.8 | 1.8 | 1.8 |  |
|  |  | Alumina (average primary diameter 17 nm) | 3.6 |  |  |  |
|  |  | Alumina (average primary diameter 13 nm) |  | 3.6 |  |  |

TABLE 3-continued

|  |  |  | Ex. 3-1 | Ex. 3-2 | Ex. 3-3 | Comp. Ex. 1 |
|---|---|---|---|---|---|---|
|  |  | Alumina (average primary diameter 11 nm) |  |  | 3.6 |  |
|  |  | Water | 91.1 | 91.1 | 91.1 | 96.0 |
|  |  | Total | 100.0 | 100.0 | 100.0 | 100.0 |
| Half-immersion 170° C. | Un-immersed part: Point in drawing test | 72 hrs | 5 | 5 | 5 | 4 |
|  |  | 168 hrs | 5 | 5 | 5 | 3.8 |
|  | Immersed part: Point in drawing test | 72 hrs | 5 | 5 | 5 | 1.5 |
|  |  | 168 hrs | 4.5 | 4 | 3.5 | 1.8 |

Examples 4-1 and 4-2

On the both surfaces of a stainless steel plate, a treatment liquid for forming a coating film obtained by mixing components in a blending ratio (wt %) shown in Table 4 was applied by means of a roll coater and dried at 180° C. to form a coating film (amount of coating film: 450 mg/m$^2$). Subsequently, in the same manner as in Example 1-1, a primer layer and a rubber layer were formed on the coating film, thereby to obtain samples. The alumina used had a primary particle diameter of 13 nm.

For the resulting samples and the sample in Comparative Example 1, an evaluation was conducted in the same manner as in Example 3-1. The results are shown in Table 4.

TABLE 4

|  |  |  | Ex. 4-1 | Ex. 4-2 | Comp. Ex. 1 |
|---|---|---|---|---|---|
| Metal treatment layer | Blended amount [wt %] | Aluminum phosphate | 3.5 | 3.5 | 2.4 |
|  |  | Silica |  |  | 1.6 |
|  |  | Zirconia | 1.8 | 1.8 |  |
|  |  | Vapor phase alumina (amorphous) | 3.6 |  |  |
|  |  | Alumina sol (crystalline) |  | 3.6 |  |
|  |  | Water | 91.1 | 91.1 | 96.0 |
|  |  | Total | 100.0 | 100.0 | 100.0 |
| Half immersion 170° C. | Un-immersed part: Point in drawing test | 72 hrs | 5 | 5 | 4 |
|  |  | 168 hrs | 5 | 5 | 38 |
|  | Immersed part: Point in drawing test | 72 hrs | 5 | 5 | 1.5 |
|  |  | 168 hrs | 4 | 3.5 | 1.8 |

Examples 5-1 and 5-2

On the both surfaces of a stainless steel plate, a treatment liquid for forming a coating film obtained by mixing components in an amount ratio (wt %) shown in Table 5 was applied by means of a roll coater, followed by drying at 180° C. to form a coating film (amount of coating film: 450 mg/m$^2$). Subsequently, in the same manner as in Example 1-1, a primer layer and a rubber layer were formed on the coating film, thereby to obtain samples.

For the resulting samples, resistance to an anti freezing liquid was evaluated by the following method.

The samples prepared above were immersed in a car radiator coolant (Toyota Genuine Long Life Coolant) to a position half of the sample (half-immersed) such that they became perpendicular to a liquid level thereof, and allowed to stand at a liquid temperature of 170° C. for 72 hours, 120 hours and 144 hours. Then, the sample was taken out of the coolant, and subjected to a drawing test for an immersed part.

A spiral with a radius of 4.5 mm was drawn 25 times on the surface of the sample by using a drawing tester specified in JIS-K6894, and the sample was evaluated by the same criteria as Example 1-1. The results thereof are shown in Table 5.

TABLE 5

|   |   |   | Ex. 5-1 | Ex. 5-2 |
|---|---|---|---|---|
| Metal treatment layer | Blended amount [wt %] | Aluminum phosphate | 2.6 | 3.4 |
|   |   | Silica |   |   |
|   |   | Zirconia | 6.3 |   |
|   |   | Alumina |   |   |
|   |   | Titania |   | 5.5 |
|   |   | Water | 91.1 | 91.1 |
|   |   | Total | 100.0 | 100.0 |
| Half immersion 170° C. | Point in drawing test (Immersed part) | 72 h | 5 | 5 |
|   |   | 120 h | 3.5 | 2 |
|   |   | 144 h | 3 | 2 |

Although only some exemplary embodiments and/or examples of this invention have been described in detail above, those skilled in the art will readily appreciate that many modifications are possible in the exemplary embodiments and/or examples without materially departing from the novel teachings and advantages of this invention. Accordingly, all such modifications are intended to be included within the scope of this invention.

The documents described in the specification and the specification of Japanese application(s) on the basis of which the present application claims Paris convention priority are incorporated herein by reference in its entirety.

The invention claimed is:

1. A gasket material to be mounted in a vehicle engine, comprising a steel plate and, on one or both sides of the steel plate, a rubber layer via a coating film consisting essentially of a reaction product of an acid component and a metal or a reaction product of an acid component and a metal compound, and alumina; wherein
   the metal or a metal in the metal compound is neither Ti (titanium), Zr (zirconium) nor Zn (zinc).

2. The gasket material according to claim 1, wherein the acid component is at least one selected from phosphoric acid, orthophosphoric acid, fused phosphoric acid, phosphoric anhydride, acetic acid, formic acid, sulfuric acid, nitric acid, hydrofluoric acid, a fluoro complex and an organic acid.

3. The gasket material according to claim 1, wherein the acid component is a mixture obtained by combining two or more different kinds selected from phosphoric acid, orthophosphoric acid, fused phosphoric acid, phosphoric anhydride, acetic acid, formic acid, sulfuric acid, nitric acid, hydrofluoric acid, a fluoro complex and an organic acid.

4. The gasket material according to claim 1, wherein the metal or a metal in the metal compound is at least one selected from Fe (iron), Ni (nickel), Al (aluminum), Mg (magnesium), Mn (manganese), Ca (calcium), W (tungsten), Ce (cerium), V (vanadium), Mo (molybdenum), Li (lithium) and Co (cobalt).

5. The gasket material according to claim 1, wherein the blending amount of the metal or metal compound in the coating film is 30 to 90 wt % wherein in the case of a metal compound, the blending amount is a value obtained by converting to an amount of the metal element.

6. A gasket material to be mounted in a vehicle engine, comprising
   a steel plate, and on one or both sides of the steel plate,
   a coating film consisting essentially of a reaction product of an acid component and a metal or a reaction product of an acid component and a metal compound, and alumina; a primer layer that does not contain polybutadiene, hydrogenated polybutadiene and modified polybutadiene; and a rubber layer in this order; wherein the metal or a metal in the metal compound is neither Ti (titanium), Zr (zirconium) nor Zn (zinc).

7. The gasket material according to claim 6, wherein the blending amount of the metal or metal compound in the coating film is 30 to 90 wt % wherein in the case of a metal compound, the blending amount is a value obtained by converting to an amount of the metal element.

* * * * *